(12) United States Patent
Jaeker

(10) Patent No.: US 10,378,610 B2
(45) Date of Patent: Aug. 13, 2019

(54) LINE GUIDE DEVICE

(71) Applicant: igus GmbH, Cologne (DE)

(72) Inventor: Thilo-Alexander Jaeker, Sankt Augustin (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 15/507,966

(22) PCT Filed: Aug. 10, 2015

(86) PCT No.: PCT/EP2015/068374
§ 371 (c)(1),
(2) Date: Mar. 1, 2017

(87) PCT Pub. No.: WO2016/034373
PCT Pub. Date: Mar. 10, 2016

(65) Prior Publication Data
US 2017/0292588 A1  Oct. 12, 2017

(30) Foreign Application Priority Data

Sep. 1, 2014  (DE) .................... 20 2014 104 075 U

(51) Int. Cl.
| | |
|---|---|
| *F16G 13/16* | (2006.01) |
| *H02G 11/00* | (2006.01) |
| *H01F 7/06* | (2006.01) |
| *H02G 3/04* | (2006.01) |

(52) U.S. Cl.
CPC ............ *F16G 13/16* (2013.01); *H01F 7/064* (2013.01); *H02G 11/006* (2013.01); *H02G 3/0475* (2013.01)

(58) Field of Classification Search
CPC ....... F16G 13/16; H01F 7/064; H02G 11/006; H02G 3/0475
(Continued)

(56) References Cited

U.S. PATENT DOCUMENTS 6,405,843 B1 * 6/2002 Friedman ............. H01B 7/0869
191/12.4
7,521,633 B2  4/2009 Jostmeier et al.
(Continued)

FOREIGN PATENT DOCUMENTS

| CN | 203322160 | 12/2013 |
|---|---|---|
| DE | 202005005826 | 7/2005 |

(Continued)

OTHER PUBLICATIONS

PCT International Search Report dated Nov. 18, 2015, received in corresponding PCT Application No. PCT/EP2015/068374. English translation attached.

(Continued)

*Primary Examiner* — David B Jones
(74) *Attorney, Agent, or Firm* — Grossman, Tucker, Perreault & Pfleger, PLLC

(57) ABSTRACT

In a cable routing device having a cable carrier and a guiding device for the cable carrier, wherein the cable carrier has a first strand connected to a first connector and a second strand connected to a second connector, which are connected to one another via a rerouting area, and the guiding device having a contact area for the stationary contact of at least one part of one of the strand is provided for a secure contact of the corresponding part of the strand with the contact area and for preventing sliding friction, the cable carrier having at least one magnet, and the contact area having a ferromagnetic or ferrimagnetic material, wherein the magnet interacts with the contact area in a predetermined positioning area of the cable carrier relative to the guiding device such that the strand having the magnet adheres to the contact area with a predetermined magnetic attractive force.

40 Claims, 7 Drawing Sheets

(58) Field of Classification Search
USPC .......................................................... 59/78.1
See application file for complete search history.

(56) References Cited

U.S. PATENT DOCUMENTS

| | | | |
|---|---|---|---|
| 7,735,309 B2 | 6/2010 | Jostmeier et al. | |
| 7,849,667 B2 | 12/2010 | Jaeker et al. | |
| 8,987,599 B2 * | 3/2015 | Reuss | H02G 11/006 174/113 R |
| 2007/0144376 A1 * | 6/2007 | Jostmeier | H02G 11/006 101/350.1 |
| 2017/0292588 A1 * | 10/2017 | Hermey | F16G 13/16 |
| 2019/0040935 A1 * | 2/2019 | Hermey | F16L 3/015 |

FOREIGN PATENT DOCUMENTS

| | | | | |
|---|---|---|---|---|
| DE | 202006019646 | | 4/2007 | |
| DE | 102008018645 | | 8/2007 | |
| DE | 202007005478 | * | 8/2007 | ............ F16G 13/16 |
| DE | 102011107680 | | 1/2013 | |
| EP | 1223410 | | 7/2002 | |
| EP | 2 546 546 | | 1/2013 | |
| JP | S55-18660 | | 2/1980 | |
| JP | H0678439 | | 3/1994 | |
| WO | 2005/048432 | | 5/2005 | |
| WO | 2007/065422 | | 6/2007 | |
| WO | 2008/049824 | | 5/2008 | |

OTHER PUBLICATIONS

English translation of PCT International Preliminary Report on Patentability dated Mar. 7, 2017, received in corresponding PCT Application No. PCT/EP2015/068374.

Office Action from related Japanese Appln. No. 2017-530416, dated Jul. 24, 2018. English translation attached.

* cited by examiner

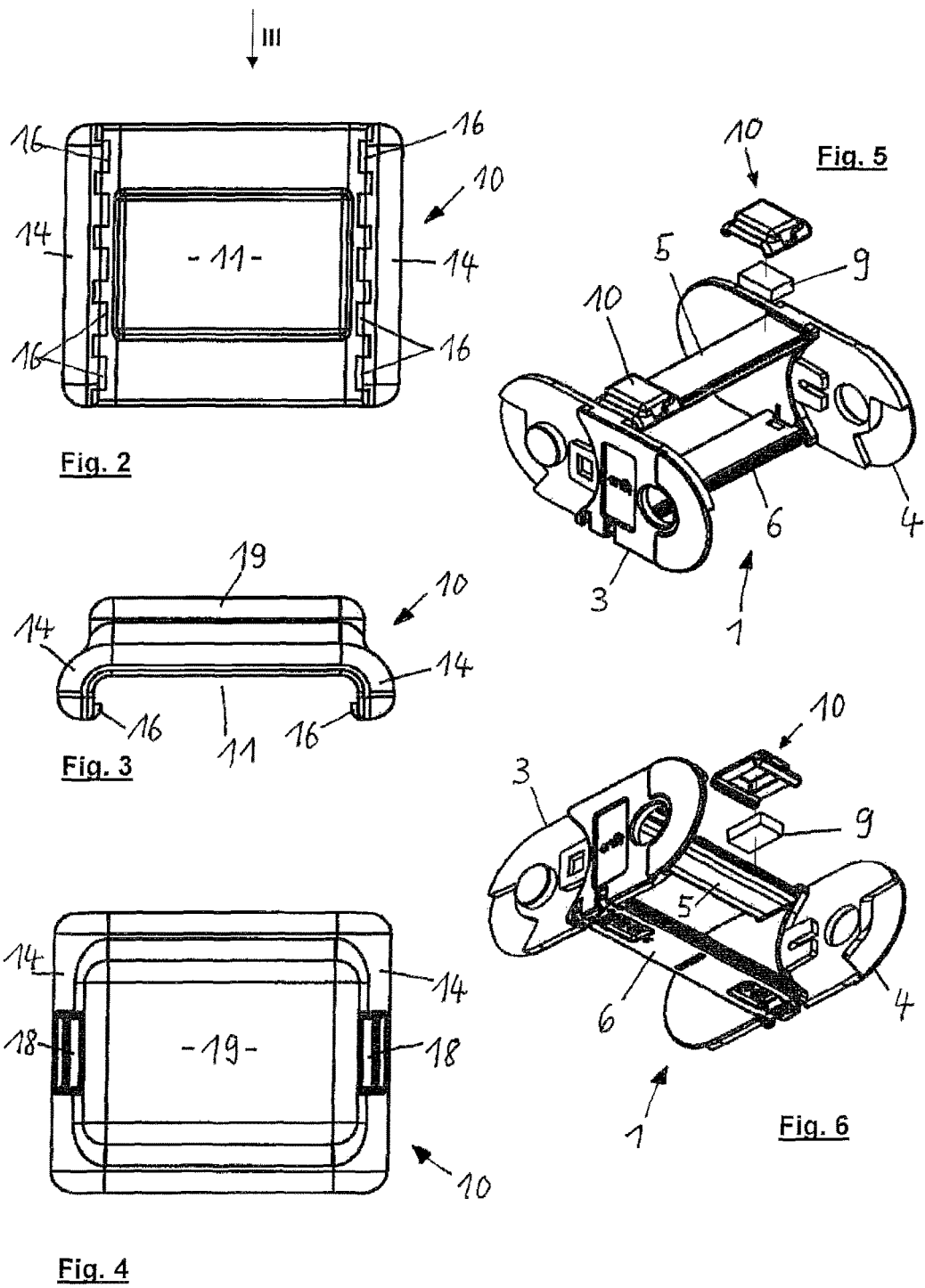

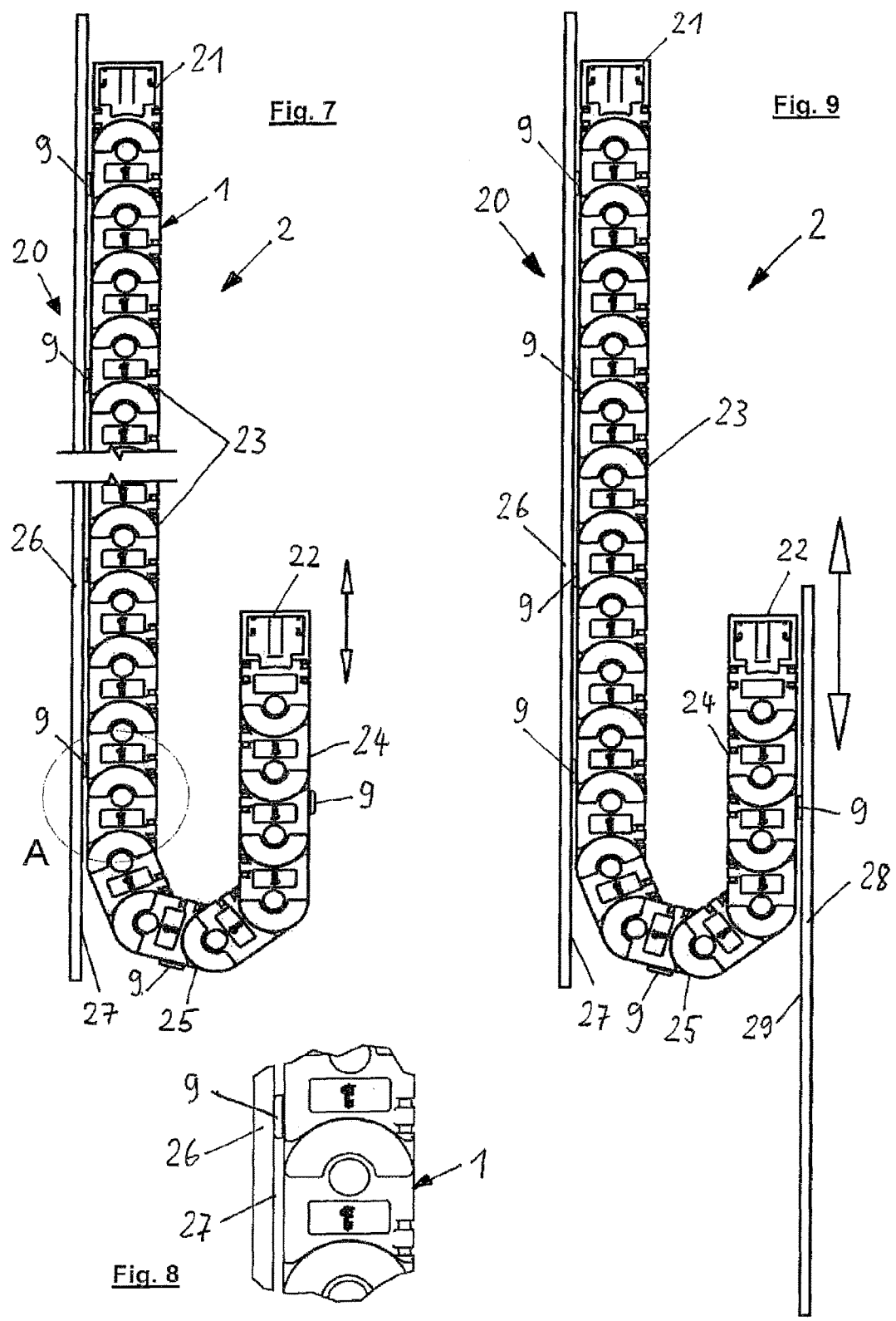

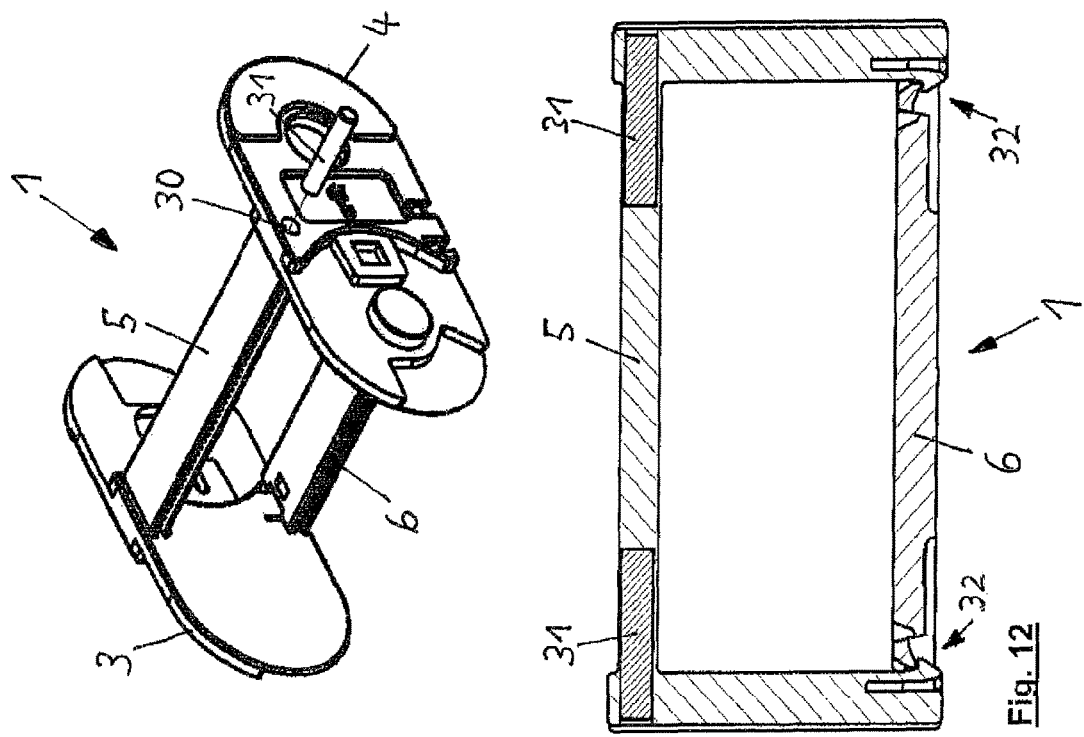
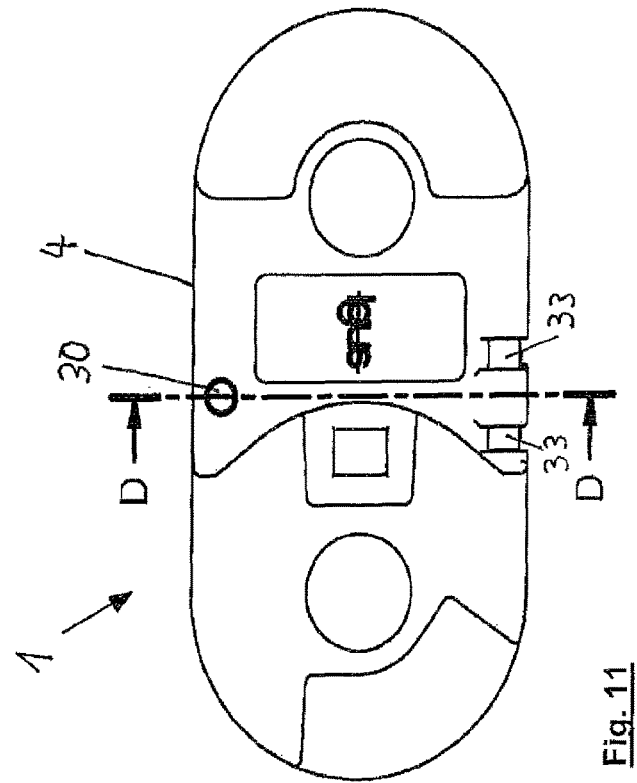

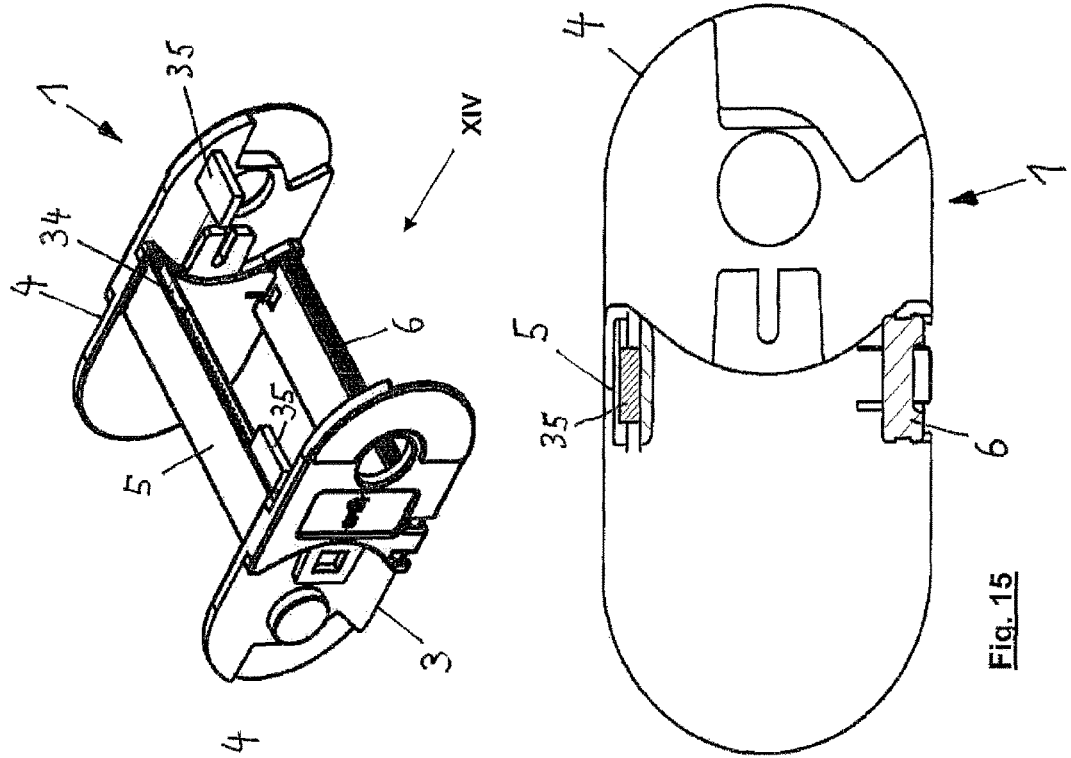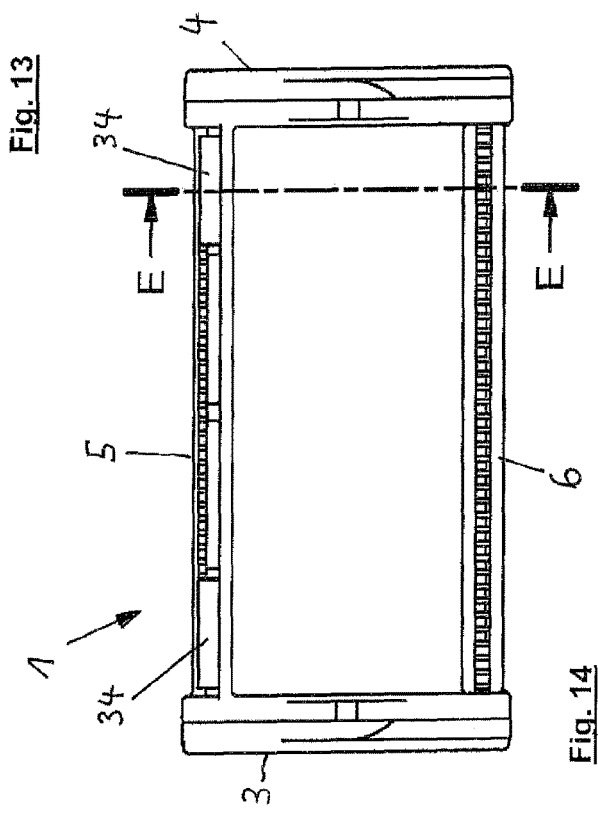
Fig. 13
Fig. 14
Fig. 15

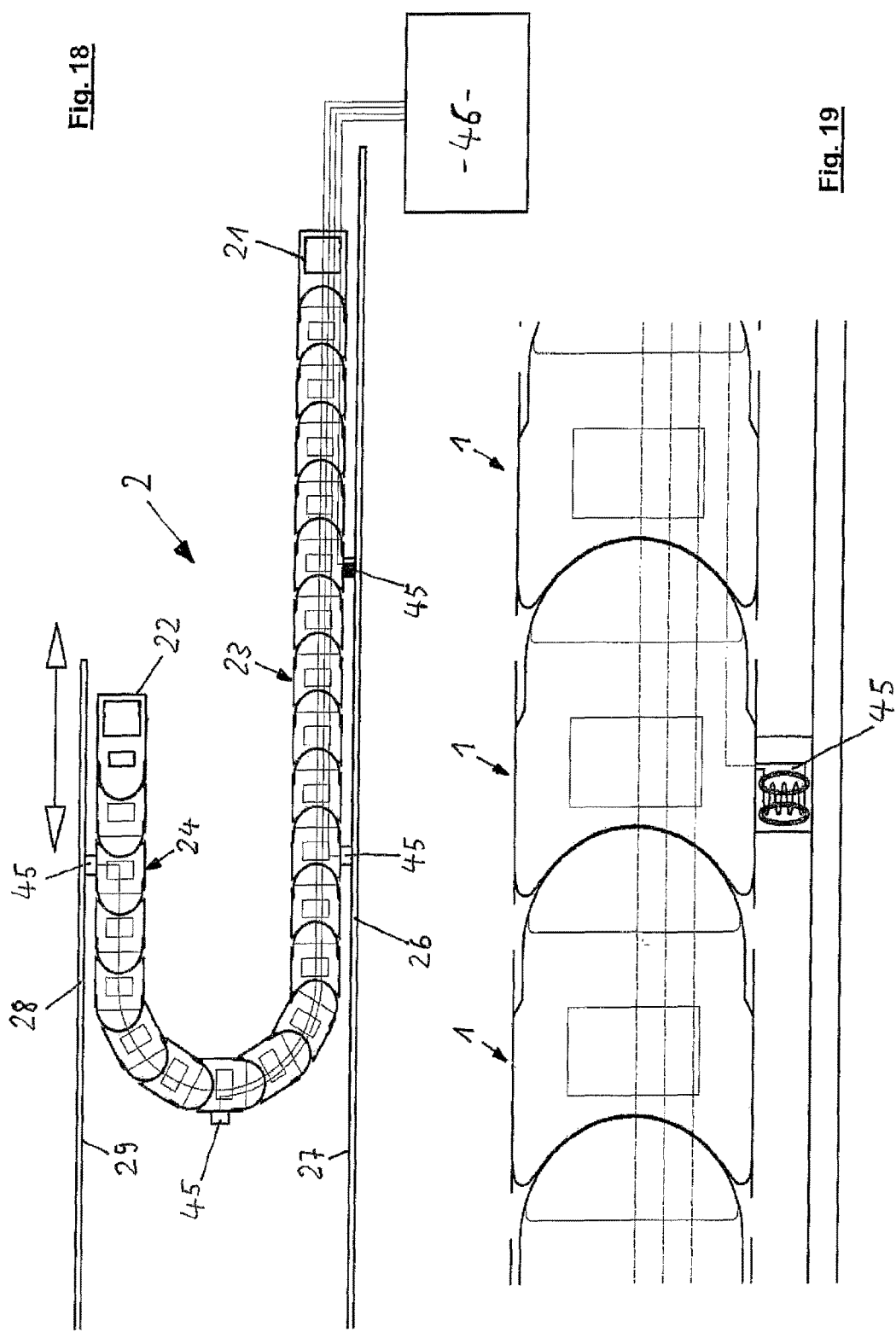

LINE GUIDE DEVICE

FIELD OF THE INVENTION

The invention concerns a line guide device comprising a line carrier for receiving and guiding lines between a first connection and a second connection which are moveable relative to each other, and a guiding device for the line carrier, wherein the line carrier has a first run connected to the first connection and a second run connected to the second connection, which runs are connected together by a direction-changing region, and the guiding device has at least one contact region for stationary contact of at least a part of one of the runs.

BACKGROUND

Line guide devices of the above-indicated kind are known in various configurations for support or contact of one of the two runs or both runs of a line carrier, for example an energy guiding chain. Different guiding devices are used depending on the arrangement and guidance of the line carrier in order suitably to support or hold the runs by contact regions of an appropriate configuration.

In one kind of application the two runs are arranged horizontally and in mutually superposed relationship. A distinction is therefore drawn between the upper run and the lower run of the line carrier. The lower run is generally connected to a stationary connection and is set down on a base or a suitable guiding device. The upper run which in this case is connected to a moveable connection can either be guided in self-supporting relationship or, after a self-supporting region adjoining the direction-changing region, it is set down on the lower run and is guided beyond the stationary connection of the lower run by a suitable guiding device or is guided entirely by a suitable guiding device. In that case the upper run can slide on the guiding device or can be supported and entrained by same.

In another horizontal application the two runs are arranged in mutually juxtaposed relationship. In that case the two runs lie laterally on a horizontal support surface and, particularly when longer displacement travels of the line carrier are involved, they are supported by contact surfaces to prevent horizontal movements, at the side facing outwardly in relation to the direction-changing region and at the side facing inwardly in relation to the direction-changing region.

Support of the sides of the runs which face outwardly in relation to the direction-changing region and possibly inwardly is required in many cases even with a vertical arrangement if the line carrier is displaced in a vertical direction. When longer displacement travels and higher displacement speeds are involved, the runs must be prevented from oscillating or knocking against each other by suitable guiding devices. Particularly with vertical applications guiding devices for supporting the sides of the runs, that face outwardly and inwardly in relation to the direction-changing region of the line carrier, are relatively complicated and expensive as support for the inward sides must permit the line carrier to pass through the direction-changing region. Support for the run connected to a moveable connection, at its inwardly and/or outwardly facing side, in addition results in unwanted sliding friction.

A line guide device of the kind set forth in the opening part of this specification is known from DE 20 2007 005 478 U1. In that arrangement the guiding device has a guide channel having a contact region for the side, facing outwardly in relation to the direction-changing region of the line carrier, of the run which is connected to the stationary connection. In addition the known guiding device has at least one holding device for supporting the run connected to the stationary connection, at the side facing inwardly in relation to the direction-changing region.

The holding device is designed in the manner of a rocker member which is pivotable in a plane extending perpendicularly to the central longitudinal plane of the line carrier, that is perpendicular to the above-mentioned contact region. The rocker-like holding device has at an end a contact region for stationary contact at the side of the run facing inwardly in relation to the direction-changing region of the line carrier, while at the other end it has a projection cooperating with a side surface of the run, that is arranged perpendicularly to the inwardly and the outwardly facing sides.

By virtue of contact with that side surface the rocker-like holding device is pivoted in such a way that the contact region arranged at the opposite end engages behind the side of the run, that faces inwardly in relation to the direction-changing region. If contact with that side surface is lost when the run passes into the direction-changing region upon displacement of the line carrier then the rocker-like holding device is pivoted in the reverse direction so that the contact region no longer engages behind the inwardly facing side of the run at the opposite end of the holding device, and can thus pass the direction-changing region of the line carrier.

The rocker-like holding device is arranged pivotably at at least one side wall of the guide channel and engages with the contact region for the side of the line carrier, that faces inwardly in relation to the direction-changing region, and the projection cooperating with a side surface of the run, depending on its respective pivotal position, through an opening in the side wall of the guide channel.

The guiding device known from the above-mentioned publication for a vertically hanging run of a line carrier, that is connected to the stationary connection, is also relatively complicated and expensive. Support in respect of the run connected to the moveable connection by such a guiding device further leads to unwanted sliding friction with the contact region and the projection of the holding device, that cooperates with a side wall of the line carrier, and with the other contact regions for the moveable run.

SUMMARY

Therefore the object of the present invention is to provide a guiding device for a line guide device of the kind referred to in the opening part of this specification for the specified different applications of a line carrier, which without involving a relatively great amount of complication and expenditure permits secure contact for at least one run at a contact region of the guiding device and avoids sliding friction.

According to the invention that object is attained in that, in a line guide device of the kind set forth in the opening part of this specification, the line carrier has at least one magnet and the contact region for stationary contact of at least a part of one of the runs has a ferromagnetic or ferrimagnetic material, wherein in a predetermined positional region of the line carrier in relation to the guiding device the at least one magnet cooperates with the contact region in such a way that the run having the magnet adheres to the contact region with a predetermined magnetic attraction force.

The magnetic attraction force causing the run to adhere to the contact region can be such that to a certain degree it compensates for forces directed against it and acting on the line carrier so that release of the region of the run, that is provided with the magnet, from the contact region is still made possible by the force causing displacement of the line carrier. In other words, the force acting towards the direction-changing region for displacement of the line carrier is capable of moving the region of the run, that is provided with the at least one magnet, into the direction-changing region. That is required in particular if the at least one magnet is a permanent magnet. Possible oscillations of the run upon displacement of the line carrier over relatively long displacement travel distances and/or at relatively high speeds, which can lead to the runs knocking against each other when they are arranged vertically, are avoided thereby.

Line guide devices having line carriers which have at least one magnet are admittedly already known from DE 103 52 461 A1. The at least one magnet however cooperates with an oppositely disposed magnet at the inside of a deposit channel forming the guiding device, in such a way that the line carrier can be held in freely floating relationship in the region of the magnets in the channel. As identical poles of the magnets are opposite to each other this arrangement does not involve contact of the regions of the line carrier and the deposit channel, that have the magnets. The line guide device in accordance with DE 103 52 461 A1 is intended precisely to avoid contact between those regions while the repelling magnetic force while the present invention aims at secure contact of those regions against each other.

A line guide device provided with magnets and having a line carrier and a guiding device for the line carrier is also already known from DE 10 2006 019 218 B4. The guiding device has two mutually opposite guides having at least two adjacent magnets with opposite poles, between which at least a part of the line carrier can be arranged. The line carrier has at least in part a ferromagnetic or ferrimagnetic material which can be magnetized by the magnetic field produced by the poles. The magnetic forces caused by the magnetic interaction hold the line carrier in freely floating fashion between the side guides having the oppositely disposed magnets. That known line guide device is also of such a configuration that the line carrier between the side guides having the magnets does not come into forced contact with the guiding device. The present invention however is aimed precisely at a forced contact to provide for secure contact of the line carrier against the guiding device.

The contact region having a ferromagnetic or ferrimagnetic material in accordance with the present invention can be arranged at a side of the guiding device, that is opposite to the side of the line carrier, facing outwardly in relation to the direction-changing region. The contact region can extend along one of the runs or along both runs (each having a respective contact region). The at least one magnet is then disposed at the side of the line carrier, that faces radially outwardly in the direction-changing region. A contact region having ferromagnetic or ferrimagnetic material can also be arranged at a side of the guiding device, that is opposite the side of the line carrier, facing inwardly in relation to the direction-changing region. In this case at least one magnet is arranged at the inwardly facing side of the line carrier.

A contact region having ferromagnetic or ferrimagnetic material, that cooperates with one or more magnets on the line carrier, can also be provided at a side wall of the guiding device, that is arranged at an angle not equal to zero relative to the outwardly facing side.

The ferromagnetic or ferrimagnetic material of the contact region of the guiding device can be in the form of particles bonded in plastic material. The guiding device can overall consist of a plastic-bonded magnetizable material. On the other hand certain regions of the guiding device can be produced from a plastic-bonded magnetizable plastic. Those regions can be connected by all usual means to the other regions of the guiding device, for example being produced with same by a two-component injection molding process. What is essential for the present invention is that a ferromagnetic or ferrimagnetic material is used, which interacts with the at least one magnet arranged at or in the line carrier, in such a way that the line carrier is held at the guiding device solely by the interaction between the ferromagnetic or ferrimagnetic material and the magnet, without additional means causing them to adhere together.

The at least one magnet can be an in particular plastic-bonded permanent magnet. If it is not to be arranged releasably on or in the line carrier, the plastic-bonded permanent magnet can be connected with all usual means to the other regions of the line carrier, for example it can be produced with the other regions by a two-component injection molding process.

Preferably the at least one magnet is fixed releasably to the line carrier. Thus, depending on the use of the line carrier it can be disposed at a desired position thereof for the adhesion of a given region of the line carrier to a contact region of the guiding device.

In particular the line carrier can have at least one respective magnet at equidistant regions in its longitudinal direction.

For certain situations of use the guiding device can have a contact region having ferromagnetic or ferrimagnetic material exclusively for one of the runs. In many cases it is sufficient for the run connected to a stationary connection to be stabilized upon displacement of the line carrier, for example in the vertical direction, and for that purpose in accordance with the invention to be provided with at least one magnet cooperating with a contact region of the guiding device, that is in opposite relationship to the outwardly facing side of the run.

In other cases in addition or alternatively the run connected to a moveable connection can be provided with at least one magnet cooperating with a contact region of the guiding device, that is arranged stationarily with respect to that run, that is to say that is entrained with that run. The contact region is desirably disposed opposite the outwardly facing side of the run connected to the moveable connection. With an adequate magnetic attraction force which prevents release of the run from the contact region entrained therewith when the line carrier is displaced displacement of the line carrier can be implemented by coupling the contact region to a suitable drive.

If both runs have a contact region with ferromagnetic or ferrimagnetic material the guiding device can include a first guiding device for the first run and a second guiding device, moveable relative thereto, for the second run, which each have at least one contact material with ferromagnetic or ferrimagnetic material.

The contact region containing ferromagnetic or ferrimagnetic material preferably has a flat contact surface in opposite relationship to the line carrier.

The line guide device can have as the line carrier an energy guiding chain whose chain links respectively include two side plates and transverse legs connecting them together.

The chain links of the energy guiding chain can each have an outer transverse leg in relation to the direction-changing region and an inner transverse leg in relation to the direction-changing region, wherein the at least one magnet is arranged in the region of a transverse leg of a chain link, where, in a predetermined positional region of the line carrier, in relation to the guiding device, it cooperates with a contact region of the guiding device that has ferromagnetic or ferrimagnetic material, in such a way that the run having the transverse leg adheres with a predetermined magnetic attraction force to the contact region.

Preferably the at least one magnet is arranged in the region of an outer transverse leg of a chain link so that the region of the run of the energy guiding chain, that has the magnet, at its side facing outwardly in relation to the direction-changing region, comes into contact at the contact region having ferromagnetic or ferrimagnetic material.

In a desirable development of the invention provided at at least one chain link are at least two magnets arranged symmetrically in relation to the longitudinal central plane of the energy guiding chain, that extends parallel to the side plates.

The at least one magnet can be arranged in a holder which can be clipped on to a transverse leg.

The holder can have a pocket which is open towards the transverse leg and closed outwardly and into which the magnet can be inserted.

In another embodiment the at least one magnet can be arranged in a pocket in the transverse leg, that is open in the longitudinal direction of the energy guiding chain and into which it can be introduced preferably even when the transverse leg is closed.

In an alternative embodiment the at least one magnet can be arranged in a pocket which extends from the outside of a side plate through same into a transverse leg and into which it can be introduced from the outside.

The contact region of the guiding device, that has the ferromagnetic or ferrimagnetic material, can be in the form of a flat plate which extends over the completely extended length of the run of the line carrier, that has the at least one magnet. The plate-form contact region can have a flat contact surface for linear contact of the run. To provide for contact of the run in an arcuate configuration, for example in the case of a circular chain, the contact region in plate form can have a suitably curved contact surface, for example in the form of a circular arc.

The contact region having ferromagnetic or ferrimagnetic material, at its contact surface which faces towards the line carrier and which comes into contact therewith, can have a layer of non-magnetizable material, that covers over the ferromagnetic or ferrimagnetic material. The non-magnetizable material preferably has sound-damping properties. It can also serve to protect the magnetizable material from wear. For that purpose it preferably comprises a suitable plastic.

Alternatively or additionally the at least one magnet can be covered by a suitable layer of non-magnetizable material at its side facing towards the ferromagnetic or ferrimagnetic contact region.

The at least one magnet arranged at or in the line carrier can also be in the form of an electromagnet, in particular when the magnetic field producing the attraction force between the magnet and the contact region of the guiding device, that has a ferromagnetic or ferrimagnetic material, is such that it can be switched on and off. Switching off of the magnetic field may be desirable if the region of the run that has the magnet is to pass into the direction-changing region without additional application of force upon displacement of the line carrier. In the case of a horizontal arrangement of the upper run of a line carrier, which at its side disposed outwardly in relation to the direction-changing region, has to be held against its force of gravity by a relatively high attraction force, it is desirable to switch off the magnetic field when the run passes into the direction-changing region and to switch on the magnetic field when the upper run is displaced rearwardly in the transition from the direction-changing region into the upper run which is extended along the contact region.

For that purpose the at least one electromagnet can be connected in signal relationship to a control device with which the magnetic field can be switched on and off.

The control device can further be connected in signal relationship to one or more sensors which establish the position of the electromagnet-bearing region of the line carrier prior to passing into the direction-changing region and prior to or after passing out of the direction-changing region into the upper run, and pass that information to the control unit.

If desirably a plurality of electromagnets which are arranged over the maximum lengthwise extent of a run or over the length of the line carrier at given spacings are used, the electromagnets in the above-mentioned positions relative to the guiding device can be successively actuated upon displacement of the line carrier by means of the sensors and the control device in such a way that the magnetic field can be successively switched on and off in the above-described manner.

The use of electromagnets which are actuable in the above-described manner is also desirable if they are to serve to provide for adhesion of the moveable run of a line carrier to a contact region of the guiding device, which for displacement of the line carrier is coupled to a drive and entrains the run in question by virtue of the magnetic attraction force between the electromagnets and the contact region.

BRIEF DESCRIPTION OF THE DRAWINGS

Embodiments by way of example of the present invention will be described in greater detail hereinafter with reference to the drawings in which:

FIG. 2 shows a view from below of the holder shown in FIG. 1 for the magnet;

FIG. 3 shows an end view of the holder in the direction of the arrow III in FIG. 2;

FIG. 4 shows a view from above of the holder for the magnet;

FIG. 5 shows a perspective view from above of a chain link as shown in FIG. 1 with the magnet and its holder shown in an exploded condition;

FIG. 6 shows a perspective view from below of the chain link of FIG. 5;

FIG. 7 shows a side view of a line guide device with a vertical arrangement of the line carrier;

FIG. 8 shows a view on an enlarged scale of the region A in FIG. 7;

FIG. 9 shows a further embodiment of a line guide device with a vertical arrangement of the line carrier;

FIG. 10 shows a perspective view of a chain link of an energy guiding chain with an exploded view of a bar-shaped magnet and the lateral opening accommodating same;

FIG. 11 shows a side view of the chain link shown in FIG. 10 with a bar magnet fitted into the opening;

FIG. 12 shows a view in section along the line D-D in FIG. 11 in the direction of the arrows D;

FIG. 13 shows a perspective view of a chain link with an exploded view of the magnet and a pocket accommodating same in the transverse leg;

FIG. 14 shows an end view of the chain link shown in FIG. 13 in the direction of the arrow XIV;

FIG. 15 shows a sectional view along line E-E in FIG. 14 in the direction of the arrow E;

FIG. 18 shows a further embodiment of a line guide device with actuable magnets; and FIG. 19 shows an enlarged view of a region having a magnet of the line guide device shown in FIG. 18.

DETAILED DESCRIPTION

Figure 1:
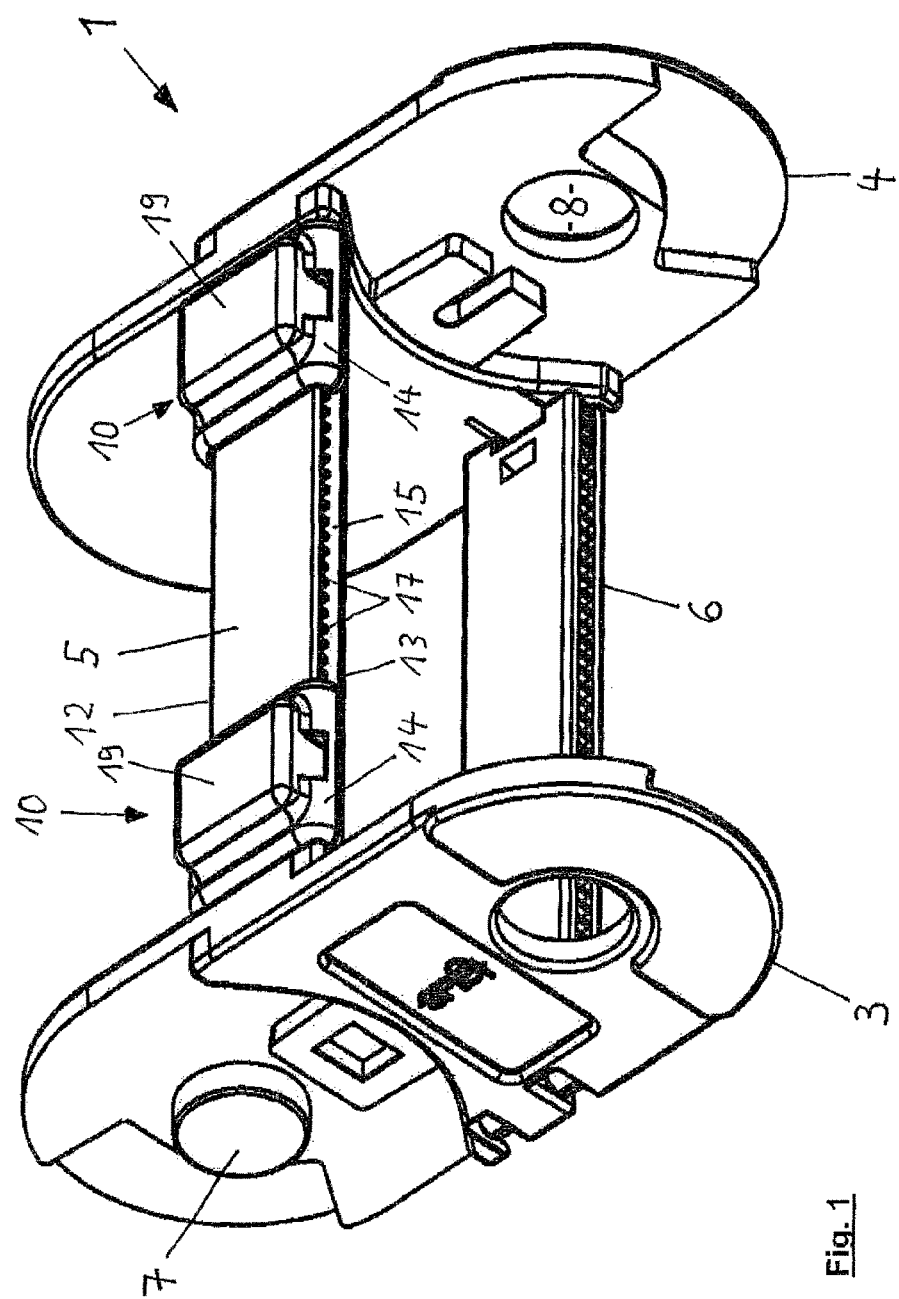
FIG. 1 shows a perspective plan view on to a chain link of an energy guiding chain having a magnet arranged on the upper transverse leg.

FIG. 1 in conjunction with FIGS. 7 through 9 and 16 through 19 shows a chain link 1 of a line carrier 2 in the form of an energy guiding chain. The chain link 1 has two side plates 3 and 4 and transverse legs 5 and 6 connecting them together. Adjacent chain links 1 of the energy guiding chain are hingedly connected together. In the illustrated embodiment hinge pins 7 and hinge openings 8 serve to make the hinged connection.

As can be seen from FIG. 1 in conjunction with FIGS. 5 and 6 two magnets 9 are arranged in the region of the upper transverse leg 5 which joins the side plates 3 and 4. These are plastic-bonded permanent magnets. The two magnets 9 are arranged symmetrically in relation to the longitudinal central plane of the line carrier 2, that extends parallel to the side plates 3 and 4.

Each magnet 9 is arranged in a holder 10 which can be clipped on to the transverse leg 5. As can be seen from FIGS. 2 through 6 the holder 10 has a pocket which is open towards the transverse leg 5 and closed outwardly and into which the magnet 9 can be fitted. The magnet 9 is held between the holder 10 and the transverse leg 5.

As can further be seen from FIGS. 1 through 6 the holder 10 at the two longitudinal sides 12 and 13 has claws 14 engaging into openings 15 in the longitudinal sides 11 and 12 of the transverse leg 5. As FIGS. 2 and 3 in particular show the claws 14 have projections 16 arranged comb-like at their engagement ends, the projections engaging between projections 17 arranged at the top side of the openings 15 of the longitudinal sides 12 and 13 of the transverse leg 5. The holders 10 for the magnets 9 can be arranged immovably on the transverse leg 5 by virtue of the projections 16 and 17 engaging tooth-like into each other.

To release the holders 10 which are clipped on to the transverse leg 5 provided at the top side of the claws 14 are recesses into which a tool can be fitted from above. The claws 14 can be released from the longitudinal sides 12 and 13 of the transverse leg 5 by pivoting the tool against an upwardly projecting region 19, having the pocket 11, of the holder 10.

In the embodiment of a chain link 1 shown in FIG. 1 the transverse leg is integrally joined to the side plates 3 and 4. The lower transverse leg 6 is separate from the side plates 3 and 4 and is connected at its two ends pivotably and by latching means to the side plates 3 and 4.

FIGS. 7 and 8 show an embodiment of a line guide device which includes a line carrier 2 composed of the chain links 1 shown in FIG. 1, namely an energy guiding chain, and a guiding device 20.

The line carrier 2 serves for receiving and guiding cables, hoses and other energy-transmitting or signal-transmitting lines (not shown in the drawing) and at its one end it has a first stationary connection 21 and at its other end it has a second moveable connection 22. A first run 23 is connected to the first connection 21 and a second run 24 is connected to the second connection. The two runs 23 and 24 are joined together by way of a direction-changing region 25 of the line carrier 2. The second moveable connection 22 can be connected to an entrainment means (not shown), by way of which the connection 22 is connected to a moveable machine part, to which energy is to be supplied by way of the line carrier from a stationary machine part connected to the first connection. Upon movement of the moveable machine part the line carrier 2 is displaced in the vertical directions indicated by the double-headed arrow in FIG. 7.

As can be seen from FIG. 7 for example each third chain link 1 is provided with two magnets 9 in holders 10 on the outer transverse leg 5, as shown in FIG. 1. The reference to the outer transverse leg 5 is to be interpreted as meaning the transverse leg which is arranged at the side of the chain link, that faces outwardly in relation to the direction-changing region 25.

Arranged opposite to the side, facing outwardly in relation to the direction-changing region 25 of the line carrier 2, of the first run 23 connected to the stationary connection 21 is a contact region 26 having a ferromagnetic or ferrimagnetic material. The contact region 26 is of a plate-shaped configuration and has a flat contact surface 27 for the first run 23 of the line carrier 2.

The contact region 26 extends approximately over the maximum length which can be reached for the first run 23 upon displacement of the line carrier 2 and is shown approximately in FIG. 7. In regard to its width the plate-form contact region 26 extends over both the magnets 9 arranged at the outer transverse legs 5 of the respective chain links 1, preferably over at least the width of the chain links 1. Besides the contact region 26 the guiding device 20 can include further parts like for example lateral guide portions for the side plates 3 and 4 of the line carrier 2.

The magnets 9 arranged at the outer transverse legs 5 cooperate in the region of the first run 23 of the line carrier 2 with the contact region 26 in such a way that the magnetic attraction force between the two causes the first run 23 to adhere to the guiding device 20 so that forces acting on the line guide in opposite relationship thereto, upon displacement of the line carrier 2 which could lead to oscillations of the line carrier 2 and could result in the two runs 23 and 24 knocking against each other are completely compensated. In that respect, the choice of the field strength of the magnets and permeability of the magnetic properties, in particular remanence, of the magnetizable material of the contact region 25 determine the attraction force such that release of the run 23 provided with the magnets 9 from the contact region 26 is still made possible by the drive force causing displacement of the line carrier 2.

The contact region 26 overall consists of a plastic-bonded magnetizable material.

FIG. 9 shows a further embodiment of a line guide device in which the line carrier 2 is of a configuration as in the above-described embodiment of FIG. 7 and there is provided a magnetizable contact region 26 for the first run 23 connected to the stationary connection 21. In addition there is a further contact region 28 for the second run 24 connected to the moveable connection 22, with which the second run 24 is entrained in the vertical directions indicated by the double-headed arrow in FIG. 9. The contact region 28 of ferromagnetic or ferrimagnetic material extends over the maximum achievable length of the run 24 upon displacement of the line carrier 2, and is of the same width as the contact region 26 for the first run 23.

The properties of the magnetizable material of the contact region 28, in particular its permeability and remanence, are so selected that, by virtue of compensation of forces occurring transversely relative to the direction of displacement and vertical tensile and compressive forces, the inertia forces which occur in the reciprocating displacement of the line carrier 2 cannot result in release of the second run 24 from the contact surface 29 of the contact region 28. Nonetheless the magnetic attraction force should be such that the force acting for displacement of the line carrier 2 into the direction-changing region 25 is capable of releasing from the contact surface 29 the region of the run 24, that is provided with magnets and that passes into the direction-changing region 25.

In certain applications with displacement travel distances which are not too long and which do not involve excessively high displacement speeds, it can be provided that the line carrier 2 is driven by way of the contact region 28 to which the run 24 adheres or a guiding device having the contact region 28 (not shown). The contact region 28 or the guiding device having same is in that case moved in turn in a vertical direction by a drive (not shown).

FIGS. 10 through 12 show a further embodiment of the arrangement of a magnet in the region of the upper transverse leg 5 of a chain link 1.

The chain link 1 is designed in the fashion of the chain link shown in FIG. 1. Provided in the side plates 3 and 4 in the proximity of the upper transverse leg 5 are cylindrical through openings 30, into each of which a respective bar-shaped magnet 31 which extends into the transverse leg can be introduced. The magnet is again in the form of a permanent magnet.

The latching means 32 with which the lower transverse leg 6 is connected to the side plates 3 and 4 can be seen from the cross-sectional view in FIG. 12. The side view of the side plate 4 in FIG. 11 also shows the hinge pins 33 arranged at the respective end of the transverse leg 6, for pivotably mounting the transverse leg 6 to the side plate 4.

FIGS. 13 through 15 show another possible arrangement of a magnet in the region of the upper transverse leg 5 of a chain link 1.

For that purpose, a plate-shaped magnet 35 which is again in the form of a permanent magnet is fitted in a pocket 34 in the transverse leg 7, that is open in the longitudinal direction of the chain link 1.

In other respects the chain link 1 shown in FIGS. 13 through 15 is designed in the fashion of the chain link 1 shown in FIG. 1.

Figure 16:
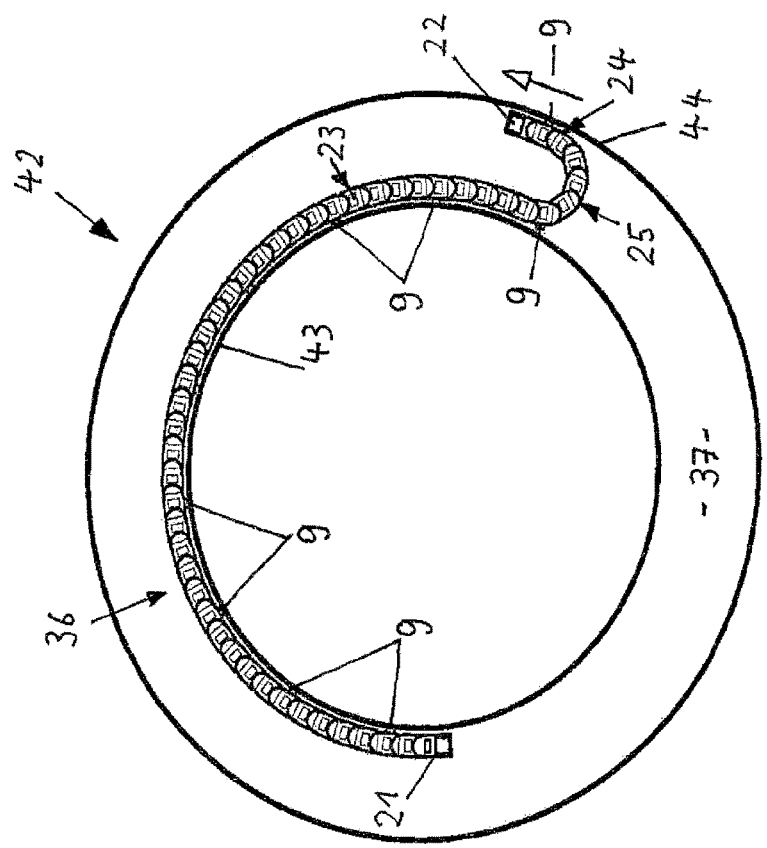
FIG. 16 shows a further embodiment of the line guide device with a guide in the shape of a circular arc of the line carrier.
Figure 17:
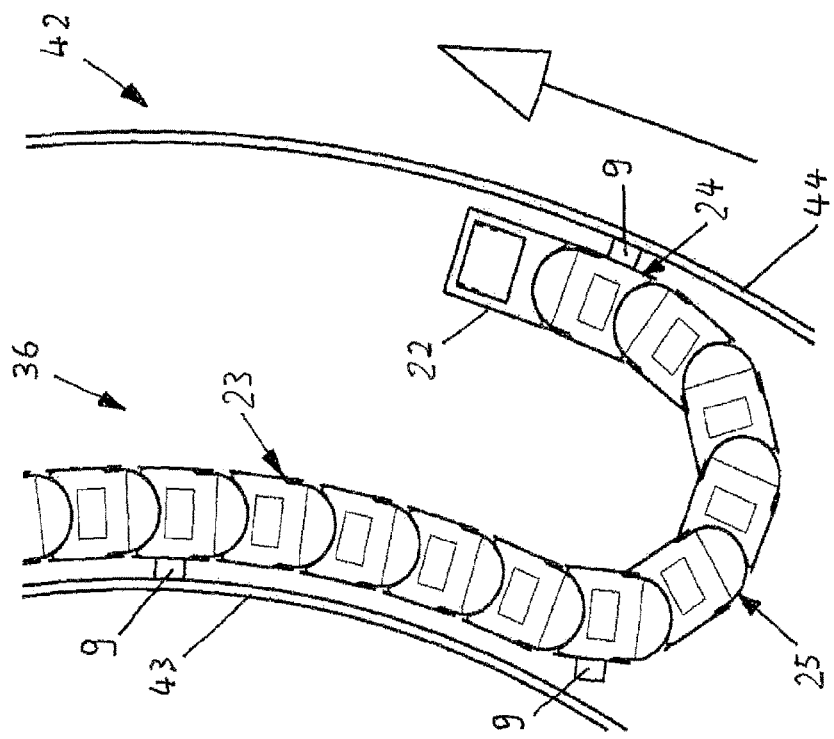
FIG. 17 shows an enlarged view of the direction-changing region of the line carrier shown in FIG. 16.

FIGS. 16 and 17 show a further application of a line carrier and a guiding device. As can be seen from these Figures the two runs 23 and 24 of the line carrier 36 extend in the shape of a circular arc. The line carrier 36 is in the form of a so-called circular chain and is displaceable within the circular ring 37 shown in FIG. 16 through an angle of 360°.

The circular chain is like the energy guiding chain used in the embodiments of FIGS. 7 and 9, having chain links 1. As the circular chain involves different curvatures in the direction-changing region 25 and in the region of the runs 23 and 24 the abutments 28-41 provided on the chain links 1 (see FIG. 1) are arranged to delimit the pivotal angle here in such a way that they allow limited pivotal movement of the chain links in both pivotal movement directions. Otherwise the line carrier 36 shown in FIGS. 16 and 17 is like the embodiments shown in FIGS. 1 through 9.

The guiding device 42 for the circular chain shown in FIGS. 16 and 17 has an inner contact region 43 for the inner run 23 and an outer contact region 44, which is concentric with respect thereto, for the outer run 24. The inner run 23 is connected to the stationary connection 21 which is arranged stationarily in relation to the inner contact region 43 while the outer run 24 is connected to the moveable connection 22 which is arranged stationarily with respect to the outer contact region 44 which is rotatably moveable relative to the inner contact region 43.

In the position shown in FIGS. 16 and 17 of the circular chain, the inner run 23 extends over its maximum length. The direction of displacement of the circular chain, which takes place from that position, is shown by the arrow illustrated in FIGS. 16 and 17.

Like the line carrier 2 shown in FIGS. 7 and 9 the circular chain is equipped with magnets 9 in the region of the outer transverse legs 5 at for example each third chain link 1. As in the above-described embodiments the magnets 9 adhere in the region of the two runs 23 and 24 to the contact regions 43 and 44 which have a magnetizable material. Approximately the same demands are to be made on the field strength and the magnetic properties of the ferromagnetic or ferrimagnetic material of the contact regions 42 and 43, as in relation to the embodiment of FIG. 9 as described hereinbefore. In addition, as described in relation to the embodiment of FIG. 9, the circular chain can also be driven by the rotation of the outer contact region 43 or a guiding device having that contact region.

The circular chain and guiding device 42 shown in FIGS. 16 and 17 can be arranged in particular horizontally, in which case the circular chain is supported with its side plates 4 by a horizontal base surface in the region of the circular ring 37. In that case the force of gravity acting on the line carrier 36 is not to be compensated by the magnetic attraction force between the magnets 9 and the contact regions 43 and 44. An additional part is played only by the sliding friction between the line carrier 36 and the horizontal base plane by which the line carrier 36 is supported.

In the embodiment in FIGS. 18 and 19 the magnets 45 are in the form of electromagnets. By means of a control device 46 connected in signal relationship to the magnets 44, the magnetic field producing the attraction force between the magnets 45 and the magnetizable contact regions 26 and 28 of the guiding device 20 can be switched on and off. The magnetic field is to be switched off when the region of the run 23 or 24, that has the magnet in question, is to pass into the direction-changing region 25. The movement into the direction-changing region can thus be effected without the additional application of force in terms of displacement of the line carrier 2. Conversely, the magnetic field is to be switched on when a chain link 1 having the magnets 9, upon displacement of the line carrier 2 out of the direction-changing region 25, is passed into a run 23 or 24 respectively.

The control device 46 is further connected in signal relationship to sensors (not shown) which pass information about the position of the line carrier 2 in the displacement thereof to the control device 46 in the one or other direction indicated by the double-headed arrow in FIG. 18. The magnets 44 are successively actuated in dependence on that position so that the magnetic field produced by the respective magnet 44 is appropriately switched on and off.

In particular when the two runs 23 and 24 are arranged one above the other as shown in FIG. 18 and the line carrier 2 has a relatively long displacement travel and is of relatively high weight and/or is displaced at a relatively high speed, it is advantageous to switch off the magnetic field upon passing into the direction-changing region 25 and to switch on the magnetic field in the rearward displacement of the upper run 24 in moving out of the direction-changing region 25 into the upper run 24 which is extended along the contact region 28.

The use of electromagnets is also advantageous if the upper run of the line carrier 2 shown in FIG. 18 is driven by the contact region 28 or a guiding device having same, in order to compensate for the inertia forces exerted in that situation by the contact region 28 on the line carrier 2, by means of the magnetic attraction forces.

LIST OF REFERENCES 1 chain link
2 line carrier
3 side plate
4 side plate
5 transverse leg
6 transverse leg
7 hinge pin
8 hinge opening
9 magnet
10 holder
11 pocket
12 longitudinal side
13 longitudinal side
14 claw
15 opening
16 projection
17 projection
18 recess
19 region
20 guiding device
21 connection
22 connection
23 run
24 run
25 direction-changing region
26 contact region
27 contact surface
28 contact region
29 contact surface
30 through opening
31 magnet
32 latching means
33 hinge pin
34 pocket
35 magnet
36 line carrier
37 circular ring
38 abutment
39 abutment
40 abutment
41 abutment
42 guiding device
43 contact region
44 contact region
45 magnet
46 control device

What is claimed is:
1. A line guide device comprising:
a line carrier for receiving and guiding lines between a first connection and a second connection which are moveable relative to each other, and
a guiding device for the line carrier,
wherein the line carrier has a first run connected to the first connection and a second run connected to the second connection, which runs are connected together by a direction-changing region,
wherein the guiding device has at least one contact region for stationary contact of at least a part of one of the runs,
wherein the line carrier has at least one magnet and the contact region for stationary contact of at least a part of one of the runs has a ferromagnetic or ferrimagnetic material,
wherein in a predetermined positional region of the line carrier in relation to the guiding device the at least one magnet cooperates with the contact region such that the run having the magnet adheres to the contact region with a predetermined magnetic attraction force, and
wherein the at least one magnet is a plastic-bonded permanent magnet.
2. The line guide device as set forth in claim 1, wherein the at least one magnet is releasably fixed to the line carrier.
3. The line guide device as set forth in claim 1, wherein the line carrier has a longitudinal direction, and at equidistant regions in the longitudinal direction the line carrier has at least one respective magnet.
4. The line guide device as set forth in claim 1, wherein the guiding device has a contact region with ferromagnetic or ferrimagnetic exclusively for one of the runs.
5. The line guide device as set forth in claim 1, wherein for each of the two runs the guiding device has a contact region with ferromagnetic or ferrimagnetic material.
6. The line guide device as set forth in claim 1, wherein the contact region has a flat contact surface opposite to the line carrier.
7. The line guide device as set forth in claim 1, wherein the contact region of the guiding device, that has the ferromagnetic or ferrimagnetic material, is in the form of a flat plate which extends over the length at maximum extension upon displacement of the line carrier of the run having the at least one magnet.
8. The line guide device as set forth in claim 1, wherein at its contact surface which faces towards the line carrier and comes into contact therewith, the contact region having the ferromagnetic or ferrimagnetic material has a layer of non-magnetizable material, which covers over the ferromagnetic or ferrimagnetic material.
9. The line guide device as set forth in claim 1, wherein a contact region of the guiding device is coupled to a drive for displacement of the line carrier and entrains the run in question by the magnetic attraction force between the at least one magnet and the contact region.
10. A line guide device comprising:
a line carrier for receiving and guiding lines between a first connection and a second connection which are moveable relative to each other, and
a guiding device for the line carrier,
wherein the line carrier has a first run connected to the first connection and a second run connected to the second connection, which runs are connected together by a direction-changing region,
wherein the guiding device has at least one contact region for stationary contact of at least a part of one of the runs, wherein the line carrier has at least one magnet and the contact region for stationary contact of at least a part of one of the runs has a ferromagnetic or ferrimagnetic material, wherein in a predetermined positional region of the line carrier in relation to the guiding device the at least one magnet cooperates with the contact region such that the run having the magnet adheres to the contact region with a predetermined magnetic attraction force, and wherein the line carrier has an energy guiding chain whose chain links respectively have two side plates and transverse legs connecting same together, wherein the at least one magnet is arranged in a holder which is clipable on to a transverse leg.

11. The line guide device as set forth in claim 10, wherein the holder has a pocket which is open to the transverse leg and which is closed outwardly and into which the magnet is insertable.

12. The line guide device as set forth in claim 10, wherein the at least one magnet is releasably fixed to the line carrier.

13. The line guide device as set forth in claim 10, wherein the line carrier has a longitudinal direction, and at equidistant regions in the longitudinal direction the line carrier has at least one respective magnet.

14. The line guide device as set forth in claim 10, wherein the guiding device has a contact region with ferromagnetic or ferrimagnetic exclusively for one of the runs.

15. The line guide device as set forth in claim 10, wherein for each of the two runs the guiding device has a contact region with ferromagnetic or ferrimagnetic material.

16. The line guide device as set forth in claim 10, wherein the contact region has a flat contact surface opposite to the line carrier.

17. The line guide device as set forth in claim 10, wherein the contact region of the guiding device, that has the ferromagnetic or ferrimagnetic material, is in the form of a flat plate which extends over the length at maximum extension upon displacement of the line carrier of the run having the at least one magnet.

18. The line guide device as set forth in claim 10, wherein at its contact surface which faces towards the line carrier and comes into contact therewith, the contact region having the ferromagnetic or ferrimagnetic material has a layer of non-magnetizable material, which covers over the ferromagnetic or ferrimagnetic material.

19. The line guide device as set forth in claim 10, wherein a contact region of the guiding device is coupled to a drive for displacement of the line carrier and entrains the run in question by the magnetic attraction force between the at least one magnet and the contact region.

20. The line guide device as set forth in claim 10, wherein the chain links of the energy guiding chain respectively have a transverse leg which is an outer leg in relation to the direction-changing region and a transverse leg which is an inner leg in relation to the direction-changing region and the at least one magnet is arranged in the region of a transverse leg of a chain link.

21. The line guide device as set forth in claim 20, wherein the at least one magnet is arranged in the region of an outer transverse leg of a chain link.

22. The line guide device as set forth in claim 10, wherein provided at least one chain link are at least two magnets arranged symmetrically in relation to a longitudinal central plane of the energy guiding chain, that extends parallel to the side plates.

23. The line guide device as set forth in claim 11, wherein at its contact surface which faces towards the line carrier and comes into contact therewith, the contact region having the ferromagnetic or ferrimagnetic material has a layer of non-magnetizable material, which covers over the ferromagnetic or ferrimagnetic material.

24. A line guide device comprising:

a line carrier for receiving and guiding lines between a first connection and a second connection which are moveable relative to each other, and a guiding device for the line carrier, wherein the line carrier has a first run connected to the first connection and a second run connected to the second connection, which runs are connected together by a direction-changing region, wherein the guiding device has at least one contact region for stationary contact of at least a part of one of the runs, wherein the line carrier has at least one magnet and the contact region for stationary contact of at least a part of one of the runs has a ferromagnetic or ferrimagnetic material, wherein in a predetermined positional region of the line carrier in relation to the guiding device the at least one magnet cooperates with the contact region such that the run having the magnet adheres to the contact region with a predetermined magnetic attraction force, and wherein the line carrier has an energy guiding chain whose chain links respectively have two side plates and transverse legs connecting same together, and at least one of wherein the at least one magnet is arranged in a pocket of a transverse leg, which pocket is open in the longitudinal direction of the energy guiding chain and into which the at least one magnet is insertable in the longitudinal direction of the chain link, or wherein the at least one magnet is arranged in a pocket which extends from the outside of a side plate through same into a transverse leg and into which the at least one magnet is introducible from the outside.

25. The line guide device as set forth in claim 24, wherein the at least one magnet is releasably fixed to the line carrier.

26. The line guide device as set forth in claim 24, wherein the line carrier has a longitudinal direction, and at equidistant regions in the longitudinal direction the line carrier has at least one respective magnet.

27. The line guide device as set forth in claim 24, wherein the guiding device has a contact region with ferromagnetic or ferrimagnetic exclusively for one of the runs.

28. The line guide device as set forth in claim 24, wherein for each of the two runs the guiding device has a contact region with ferromagnetic or ferrimagnetic material.

29. The line guide device as set forth in claim 24, wherein the contact region has a flat contact surface opposite to the line carrier.

30. The line guide device as set forth in claim 24, wherein the contact region of the guiding device, that has the ferromagnetic or ferrimagnetic material, is in the form of a flat plate which extends over the length at maximum extension upon displacement of the line carrier of the run having the at least one magnet.

31. The line guide device as set forth in claim 24, wherein at its contact surface which faces towards the line carrier and comes into contact therewith, the contact region having the ferromagnetic or ferrimagnetic material has a layer of non-magnetizable material, which covers over the ferromagnetic or ferrimagnetic material.

32. The line guide device as set forth in claim 24, wherein a contact region of the guiding device is coupled to a drive for displacement of the line carrier and entrains the run in question by the magnetic attraction force between the at least one magnet and the contact region.

33. The line guide device as set forth in claim 24, wherein the chain links of the energy guiding chain respectively have a transverse leg which is an outer leg in relation to the direction-changing region and a transverse leg which is an inner leg in relation to the direction-changing region and the at least one magnet is arranged in the region of a transverse leg of a chain link.

34. The line guide device as set forth in claim 33, wherein the at least one magnet is arranged in the region of an outer transverse leg of a chain link.

35. The line guide device as set forth in claim 24, wherein provided at least one chain link are at least two magnets arranged symmetrically in relation to a longitudinal central plane of the energy guiding chain, that extends parallel to the side plates.

36. A line guide device comprising:
a line carrier for receiving and guiding lines between a first connection and a second connection which are moveable relative to each other, and
a guiding device for the line carrier,
wherein the line carrier has a first run connected to the first connection and a second run connected to the second connection, which runs are connected together by a direction-changing region,
wherein the guiding device has at least one contact region for stationary contact of at least a part of one of the runs,
wherein the line carrier has at least one magnet and the contact region for stationary contact of at least a part of one of the runs has a ferromagnetic or ferrimagnetic material,
wherein in a predetermined positional region of the line carrier in relation to the guiding device the at least one magnet cooperates with the contact region such that the run having the magnet adheres to the contact region with a predetermined magnetic attraction force, and
wherein the at least one magnet arranged at or in the line carrier is in the form of an electromagnet.

37. The line guide device as set forth in claim 36, wherein the at least one electromagnet is connected in signal relationship to a control device with which the magnetic field generated by the electromagnet is switchable on and off.

38. The line guide device as set forth in claim 37, wherein the control device is connected in signal relationship to one or more sensors with which the position of the region of the line carrier that has the electromagnet is establishable prior to the transition into the direction-changing region and prior to or after the transition out of the direction-changing region into the run in question and said items of information is passable to the control device.

39. The line guide device as set forth in claim 37, wherein there are provided a plurality of electromagnets which are arranged at predetermined spacings over the maximum longitudinal extent of a run or over the total length of the line carrier and are connected in signal relationship to the control device such that the plurality of electromagnets are successively actuable in dependence on the position of the line carrier.

40. The line guide device as set forth in claim 36, wherein a contact region of the guiding device is coupled to a drive for displacement of the line carrier and entrains the run in question by the magnetic attraction force between the at least one magnet and the contact region.

* * * * *